COLPITTS AND HARTLEY OSCILLATORS WITH SERIES RESONANT GRID CIRCUIT

Filed June 10, 1965

INVENTOR.
KLAUS KÜLPER
BY
Frank R. Trifari
AGENT

United States Patent Office 3,328,726
Patented June 27, 1967

3,328,726

COLPITTS AND HARTLEY OSCILLATORS WITH SERIES RESONANT GRID CIRCUIT

Klaus Külper, Ekero, Sweden, assignor to North American Philips Company, Inc., New York, N.Y., a corporation of Delaware Filed June 10, 1965, Ser. No. 462,973
Claims priority, application Sweden, June 15, 1964, 7,261/64
7 Claims. (Cl. 331—169)

Figure 1:
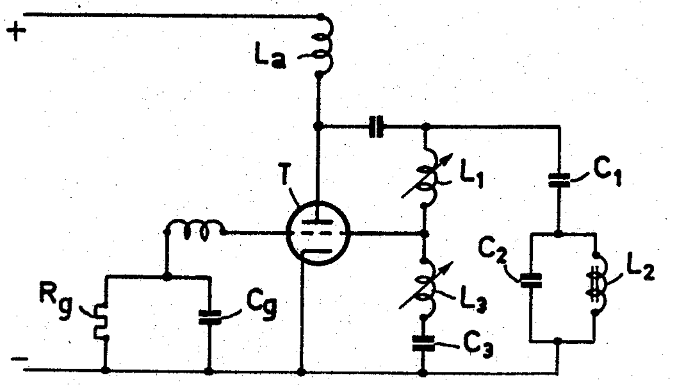

The invention relates to an electronic tube oscillator for high frequency heating, operating in a known "three-point-connection" circuit according to Colpitts or Hartley and comprising a parallel resonance circuit connected between anode and cathode, i.e. the anode circuit, which is also connected at one point to the grid. From efficiency point of view such a high frequency oscillator comprising an electronic tube (also called an oscillator in voltage dividing feedback) must operate with a relatively high anode voltage. For inductive heating purposes therefore a high frequency transformer is commonly used for transforming the high voltage high frequency power to a level which is more suitable for the induction coil or inductor. As it is furthermore a requirement that the value of the output power can be regulated within extended limits, for example when reaching the Curie-point at hardening of steel, the said high frequency transformers are commonly of the type with variable coupling. When feeding several inductors in parallel from a common oscillator, however, difficulties will arise in achieving the required distribution of power between the different inductors, and in practice it would be necessary to arrange a high frequency transformer with variable coupling for each inductor. This is a bulky and expensive solution. The use of high frequency transformers furthermore involves a drawback in that these transformers will give rise to large active and reactive losses. In order to eliminate the need for high frequency transformers it has already been proposed to increase the circulating current in the working coil by parallel connection of a capacitor. In order to get a good effect of this capacitor the resonance frequency of the circuit comprising the induction coil and the parallel connected capacitor i.e., the secondary circuit, must be relatively close to the operating frequency of the oscillator. Due to the off-resonance tuning of the secondary circuit, however, the whole oscillation system will have two parallel resonance frequencies and the oscillator may in principle oscillate at any of these frequencies. The oscillator then usually will chose the frequency which gives rise to the lowest output power. The described circuit arrangement has therefore not been of any practical importance hitherto.

According to the invention the said drawback is eliminated by the use of a selective feedback which allows the oscillator to operate at only one of the said frequencies. Thus the invention is characterized in that the portion of the anode circuit which is connected between the grid and the cathode of the tube, i.e. the grid circuit, has the form of a series resonance circuit, the resonance frequency of which lies between the two resonance frequencies of the anode circuit. This means that the condition of oscillation, i.e. opposite phase of the grid voltage with respect to the anode voltage, will be fulfilled for only one of the resonance frequencies of the anode circuit. At the second frequency which according to the above is on the other side of the series resonance frequency of the grid circuit the grid reactance and thus the grid voltage will change polarity so that a negative feedback is produced for this frequency.

By this arrangement the advantage is achieved that a sufficient current in the tuned inductor coil can be produced without use of high frequency transformers. The output power can furthermore be regulated in a very simple manner by varying one of the reactive components of the anode circuit so that the oscillator frequency is displaced in relation to the resonance frequency of the tuned secondary circuit. A displacement in direction to the resonance frequency of the tuned secondary circuit will then result in an increase of the output power and vice versa. The power regulation may for example be effected by displacement of short-circuited cylinders of conductive material situated within or outside the inductance coils included in the anode circuit and grid circuit.

Figure 2:
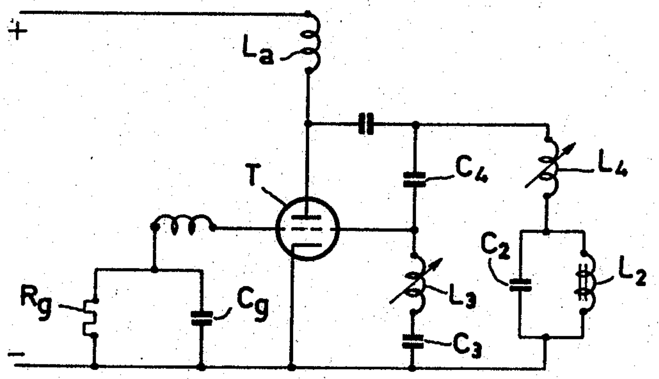

The invention is now explained more fully in connection with the attached drawing in which FIGS. 1 and 2 illustrate a Colpitts oscillator and Hartley oscillator, respectively, connected according to the invention.

The Colpitts oscillator shown in FIG. 1 consists of a triode T receiving its anode voltage from an anode voltage source through an anode impedance in the form of an inductance $L_a$ and its grid DC-voltage from a grid bias circuit $R_gC_g$. Between the anode and cathode is connected a parallel resonance circuit having one branch consisting of an inductance $L_1$ in series with a series resonance circuit $L_3C_3$ and the second branch consisting of a capacitor $C_1$ in series with a parallel resonance circuit $L_2C_2$. The grid is connected to the circuit such that the series combination of $L_3$ and $C_3$ is between the grid and the cathode. The output power is derived from $L_2$ which for example may be the inductor coil in a high frequency heating equipment. By connecting capacitor $C_2$ in parallel across the coil $L_2$ the current through the coil will be increased.

The condition for oscillations in the circuit is according to known rules:

(1) That the anode-cathode impedance is pure resistive, (2) That the voltage fed back to the grid is opposite in phase with respect to the anode voltage and (3) That the grid voltage has sufficient amplitude.

Due to the presence of capacitor $C_2$ across the working coil the first one of the said oscillation conditions will be fulfilled for two different frequencies. The second oscillation condition will be fulfilled only if the grid circuit is capacitive. The conventional Colpitts oscillator comprising only a capacitor in the grid circuit therefore can oscillate on both resonance frequencies resulting from the tuning of the working coil by means of capacitor $C_2$. In the shown example the grid circuit will be capacitive only for frequencies below the resonance frequency of the series resonance circuit $L_3C_3$. According to the invention the series resonance circuit $L_3C_3$ is dimensioned such that its resonance frequency lies between the two resonance frequencies of the anode circuit, whereby the said second oscillation condition will be fulfilled for the lower one of these two frequencies only. At the higher frequency the grid circuit will be inductive and the grid voltage consequently in phase with the anode voltage which prevents oscillation on this frequency.

The third oscillation condition is not critical and may easily be fulfilled by suitable dimensioning of $L_3$ and $C_3$.

Due to the fact that the oscillator will select the lower one of the two possible frequencies the secondary circuit $L_2C_2$ will be inductive and the current in the working coil $L_2$ will be equal to that sum of the currents through $C_1$ and $C_2$. An advantage for the described arrangement is that the current through the working coil $L_2$ and consequently the output power can be regulated within extended limits by a relatively small variation of $C_1$ or $L_1$. For achieving an increase of the output power this variation is then to be effected such that the oscillation frequency of the oscillator approaches the resonance frequency of the parallel circuit $L_2C_2$. However, if the oscillator frequency is varied but the resonance frequency of the series resonance circuit $L_3C_3$ is maintained constant the grid voltage fed back should vary in amplitude. The resonance frequency of series resonance circuit $L_3C_3$ must therefore be varied simultaneously with the oscillator frequency, which for example may be effected by varying the inductance $L_3$. Variation of the inductance of the coils $L_1$ and $L_3$ may be effected in a way known per se by displacement of cylinders of copper situated within the respective coils. It is then also simple to couple the two cylinders mechanically to each other so that a constant grid voltage is produced within the whole power regulation range.

The Harley oscillator shown in FIG. 2 differs from FIG. 1 only in the respect that the grid and the anode according to FIG. 2 are connected to each other through a capacitor $C_4$ instead of through an inductance as according to FIG. 1 and that an inductance $L_4$ is included in the second branch of the anode circuit. The condition for achieving correct phase of the grid voltage is in this circuit that the grid circuit is inductive. The resonance frequency of the series resonance circuit included in the grid circuit is as before chosen such that it lies between the two resonance frequencies of the anode circuit. The said condition is then fulfilled only for the higher one of the resonance frequencies of the anode circuit and the oscillator will consequently in this case select the higher frequency. A simple power regulation may be produced by varying for example the inductance $L_4$ and simultaneously the inductance $L_3$.

The two variable coils used for power regulation ($L_1L_3$ according to FIG. 1, $L_4L_3$ according to FIG. 2) may alternatively be inductively coupled to each other and provided with a common movable cylinder so that upon displacement of this cylinder a substantially constant voltage will be fed back to the grid. Instead of using the coil $L_2$ included in the anode circuit as working coil it is also possible to let $L_2$ be the primary coil of a high frequency transformer the secondary winding of which is connected to the working coil. The tuning of the secondary circuit may then be effected either on the primary side or the secondary side of this transformer. The tuned secondary circuit $L_2C_2$ can also be connected in the branch which is arranged between grid and anode, i.e. in series with $L_1$ and $C_4$ respectively. Finally the usability of the arrangement is not limited to inductive heating but the circuit may also be used for example for capacitive heating.

What is claimed is:

1. An oscillator circuit comprising an amplifier device having an input electrode, a common electrode, and an output electrode, an output circuit connected between said output electrode and common electrode, said output circuit comprising a parallel resonant circuit, said parallel resonant circuit having two parallel resonant frequencies, means connecting a point on said parallel resonant circuit to said input electrode, said parallel resonant circuit further comprising a series resonant circuit between said point and said common electrode, said series resonant circuit having a resonant frequency between said two parallel resonant frequencies, whereby said oscillator circuit can oscillate at only one of said parallel resonant frequencies.

2. An oscillator circuit comprising an amplifier device having an input electrode, a common electrode, and an output electrode, a first parallel circuit of first and second branches, means connecting said parallel circuit between said output and common electrodes, said first branch comprising the series connection of a first reactance and a second parallel circuit of a capacitor and output inductance means, said second branch comprising a series resonant circuit, means connecting said series resonant circuit between said common electrode and said input electrode, a second reactance, and means connecting said second reactance between said input and output electrodes, said first and second reactance being of different types, whereby said first parallel circuit has two parallel resonant frequencies, said series resonant circuit having a resonant frequency between said two parallel resonant frequencies, whereby said oscillator circuit can oscillate at only one of said two parallel resonant frequencies.

3. The oscillator circuit of claim 2 in which said device is an electron discharge device, and said input, common and output electrodes are the control grid, cathode and anode electrodes of said discharge device.

4. The oscillator circuit of claim 2 in which said first reactance is an inductor and said second reactance is a capacitor.

5. The oscillator circuit of claim 4 in which said first reactance and the inductance portion of said series resonant circuit are simultaneously variable.

6. The oscillator circuit of claim 2 in which said first reactance is a capacitor and said second reactance is an inductor.

7. The oscillator circuit of claim 6 in which said second reactance and the inductive portion of said series resonant circuit are simultaneously variable.

References Cited

UNITED STATES PATENTS

| | | | |
|---|---|---|---|
| 1,738,232 | 12/1929 | Comfort | 331—170 X |
| 1,896,781 | 2/1933 | Llewellyn | 331—170 |
| 2,368,857 | 2/1945 | McClellan | 334—63 |

ROY LAKE, *Primary Examiner.*

S. H. GRIMM, *Assistant Examiner.*